United States Patent [19]

Herrera

[11] 3,718,042
[45] Feb. 27, 1973

[54] AUTOMATIC GEOGRAPHICAL POSITION INDICATOR

[76] Inventor: Crisogono Herrera, Apdo Postal No. 1254, Monterrey, N. L., Mexico

[22] Filed: Dec. 2, 1970

[21] Appl. No.: 94,423

[52] U.S. Cl. ................................73/178 R, 116/124
[51] Int. Cl. .............................................G01c 21/00
[58] Field of Search .......73/178 R; 116/124; 33/1 M; 40/41, 42

[56] References Cited

UNITED STATES PATENTS

| | | | |
|---|---|---|---|
| 2,788,593 | 4/1957 | Davies | 73/178 R |
| 2,526,284 | 10/1950 | Schneider | 73/178 R |
| 1,916,734 | 7/1933 | Logan | 116/29 |

*Primary Examiner*—Donald O. Woodiel
*Attorney*—Kemon, Palmer & Estabrook

[57] ABSTRACT

A navigation aid primarily for aircraft pilots and which functions as an automatic position indicator includes means for clamping a conventional air navigation chart beneath a transparent hollow housing so that the projected route between fixed points on the chart is visible through the housing. Mounted within the housing and movable longitudinally therealong is a cursor member. The means for moving the cursor member along the housing and over the projected flight path is a constant speed device adjustably geared to the cursor drive so that the speed of the cursor may be adjusted to that of the aircraft whereupon the position of the cursor over the navigational chart continuously corresponds to the position of the aircraft along the predetermined flight path.

4 Claims, 9 Drawing Figures

INVENTOR
CRISOGONO HERRERA

BY Kenwon, Palmer & Estabrook

ATTORNEYS

AUTOMATIC GEOGRAPHICAL POSITION INDICATOR

BACKGROUND OF THE INVENTION

The broad concept of automatic position indicators useful as navigational aids for both surface vessels and aircraft is known and examples may be found in the following prior United States Patent Nos. 1,077,596, 1,916,734, 2,421,783, and 2,788,593. The present invention includes a number of improvements over the devices shown in these prior patents and the result is a device which is decidedly more utilitarian, more readily usable, and having a wider utility than the position indicators shown in the prior art patents mentioned above.

BRIEF SUMMARY OF THE INVENTION

In accordance with the present invention, an elongated hollow transparent housing is provided together with means for clamping the desired portion of a standard navigational chart to the underside of the housing. This enables a route previously drawn on the chart between fixed points to be positioned longitudinally of the housing and to coincide with a straight line scribed on the lower outer surface of the The the position indicator or cursor is mounted entirely within the housing and arranged to be driven longitudinally thereof at a speed proportional to the ground speed of the aircraft so that it at all times gives an instantaneous indication of the position of the craft along the predetermined route marked on the chart. The apparatus of the present invention also includes a number of scales, some adjustable and some fixed, which are useful in computing such things as the actual ground speed of the craft from the indicated speed, the setting of the drive means for the cursor in accordance with the thus computed ground speed, and a means for instantaneously indicating the length of time anticipated between instantaneous and future positions of the craft along the preselected route.

DETAILED DESCRIPTION OF THE DRAWINGS

Figure 1:
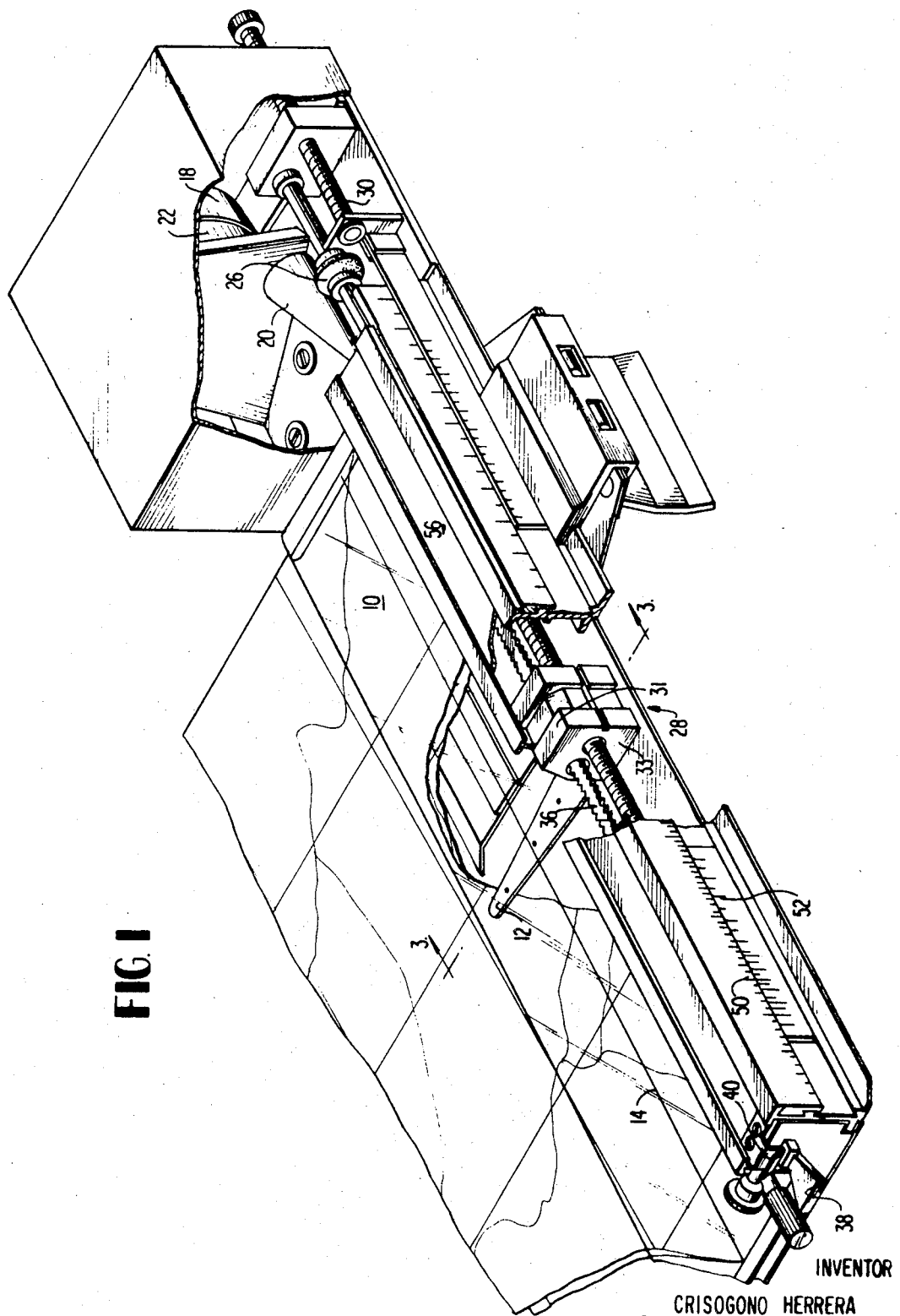
FIG. 1 is an overall perspective view of the preferred embodiment of the present invention with parts broken away to illustrate the various working components.
Figure 3:
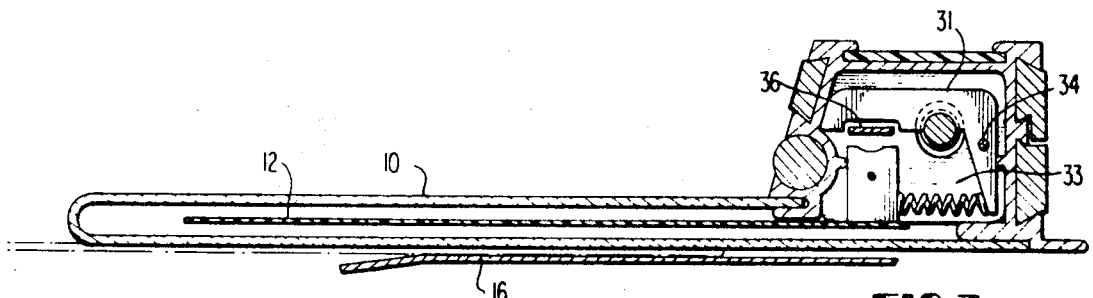
FIG. 3 is a section on the lines 3—3 of FIG. 1.

Referring first to FIGS. 1 and 3 of the drawings, it will be seen that the present device consists essentially of three basic parts, namely, an elongated, transparent, hollow housing 10, a cursor 12, and a means to drive the cursor to cause it to traverse the length of the housing 10 at a predetermined constant speed. The latter means will be identified and discussed in more detail hereinafter. For convenience, a line 14 is scribed or otherwise marked on the lower outer surface of the housing 10 so as to extend from one end to the other thereof. A clamp 16 which is releasably held against the underside of the housing 10 in any convenient and adjustable manner serves to hold a navigational chart against the underside of the housing 10.

Figure 2:
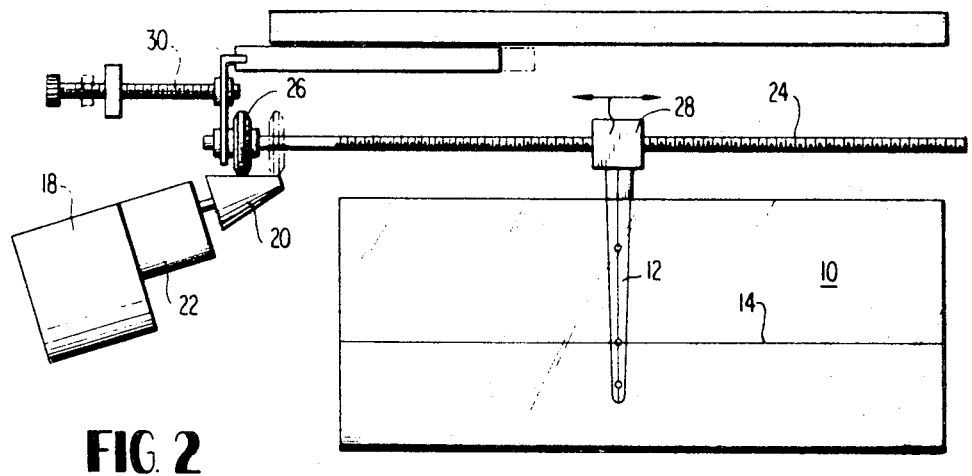
FIG. 2 is a top plan view of portions of the apparatus showing the details of the adjustable speed driving means for the cursor.

Referring now to FIG. 2, the means for driving the cursor along the interior of the housing are shown. A prime mover 18 which may be either electric or spring wound drives a cone pulley 20 through a constant speed gearing arrangement 22 which may be of any one of many known prior art types. The entire purpose of the gearing 22 is to ensure that the rotational velocity of the conical pulley 20 remains constant regardless of speed variation of the prime mover. A screw member 24 is arranged to be driven by the pulley 20 through an adjustable friction pulley 26. The cursor 12 is supported from a nut means 28, the threads of which mate with screw 24. It will be apparent therefore that depending upon the position of the adjustable pulley 26, the cursor 12 will be driven at a constant predetermined speed so that it traverses the longitudinal dimension of the housing 10. As will be apparent from FIGS. 1 and 2, the pulley 26 may be adjusted along the length of the pulley 20 by means of the screw 30 to adjust the speed of the cursor to the speed of the vehicle.

FIGS. 1 and 3 further illustrate a means for adjustably positioning the cursor 12 in order that it may be preset at any desired location along the entire length of its path of travel. The nut means 28 which engages the screw 24 comprises upper and lower members 31 and 33, respectively, which are hingedly connected together by a pin 34. The member 31 has a half-round, screw threaded portion which mates with and engages the screw 24 in the normal position of the parts as shown in FIGS. 1 and 3. The parts 31 and 33 also surround a flat elongated serrated member 36, the flat side of which is normally parallel to the upper surface of the housing 10. At one end of the member 36 there is a handle 38 shown in FIG. 1 having a portion engaged by a spring member 40 to normally hold the device in the position shown in this FIGURE. Whenever it is desired to adjust the position of the cursor within the housing, the handle 38 is simply rotated 90 degrees in either direction against the force of the spring 40. In its thus rotated position, the threaded portion of the member 31 is cammed out of engagement with the screw 24 but into engagement with the serrations on the member 36. The latter is then adjustable longitudinally of the housing to position the cursor at any desired point, after which it is again rotated 90° and returned to the position shown in FIG. 1.

OPERATION

The following detailed description of the operation of the device of the present invention will be with reference to the previously described structural details together with the particular scales, the details of which are illustrated in FIGS. 5 to 9, inclusive.

Figure 5:
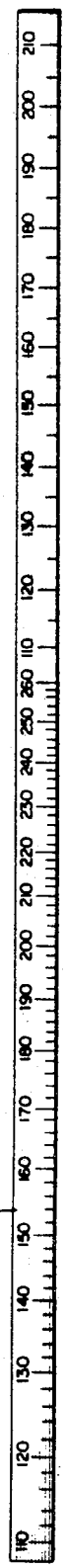
FIGS. 5 to 9, inclusive, show the details of the various scales which form a part of the present invention.
Figure 6:
Figure 7:

As is well known, it is fundamental in the navigation of any aircraft to follow a preselected route between the point of departure and arrival. For that reason, the civil authorities request that each pilot before departure file a flight plan in which is indicated the route he expects to follow and the times of departure and arrival. In the use of the present invention, the pilot first marks on a standard aeronautical chart a straight line corresponding to his intended route and connecting the points of his departure and arrival. He then folds the chart so that the flight path which he has placed thereon can be clamped to the underside of the housing 10 and the flight path line aligned with the line 14 marked on the inner surface of the housing. Once so aligned, the chart is clamped into position against the underside of the housing. The handle 38 is then rotated 90 degrees and the cursor 12 is positioned so that it overlies the point of departure on the chart. The handle 38 is then again rotated 90° and returned to the starting position shown in FIG. 1. The pilot may then proceed with his takeoff and once he has reached his flight altitude and the plane is leveled off, he reads his indicated speed, altitude and temperature from the conventional instruments on the plane for this purpose. The scale 50 shown in FIGS. 1 and 5 is graduated in speed and forms one-half of a computer arrangement which facilitates computing actual ground speed from indicated speed, altitude and temperature. The scale 52 which is positioned immediately below the scale 50 as shown in FIG. 1 is illustrated more clearly in FIG. 6. This scale includes both temperature and altitude graduations. To operate this portion of the device, the temperature on scale 52 is aligned with the indicated air speed. The actual ground speed is then read from the scale 50 at the intersection of the scale with the altitude from the scale 52. The air speed of scale 50 as shown in FIG. 5 includes in addition to the computing scale just described a further air speed scale which appears on the right hand portion of FIG. 5. It should be noted that the entire scale member 50 is fixed with respect to the housing 10. Positioned immediately beneath the right hand end of the scale 50 as viewed in FIG. 1, is a vernier speed scale 54 illustrated in FIG. 7. The scale 54 is connected to the support for the pulley 26 and moves with the adjustable pulley 26. Accordingly, once the actual ground speed has been computed as described above, the pulley 26 is positioned by turning the screw 30 until the computed ground speed along the verier scale 54 of FIG. 7 is aligned with the same speed on the scale 50. The prime mover 18 is then activated and thereafter assuming no significant variations in ground speed along the route, the cursor 12 will continuously indicate to the pilot his position along his intended route.

Another feature of the present invention which is illustrated most clearly in FIG. 1 is the provision of an erasable surface 56 which extends along the entire path of travel of the cursor 12. It is convenient for the pilot to note on this surface his estimated times of arrival at the various check points along the projected route. By comparing these estimates with his actual time of arrival which may also be noted thereon, he is able to continuously advise himself of the progress of the flight and establish corrections for the cursor's traverse speed, according to variable conditions of indicated speed temperature and altitude, and changes in the direction of flight course.

Figure 4:
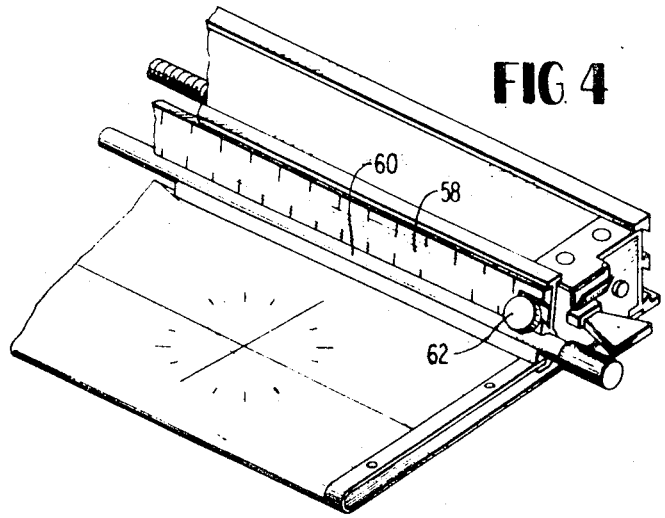
FIG. 4 is a perspective view of one end of the device taken from the side opposite that of FIG. 1.
Figure 8:
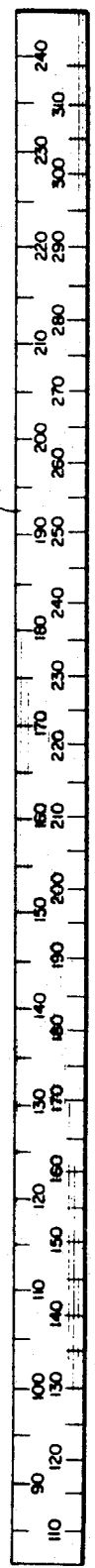
Figure 9:

Still other features of the present invention are shown in FIG. 4 and the scales shown there are illustrated in FIGS. 8 and 9. The scale 58 has on its upper surface a series of graduations corresponding to the WAC scale and the lower graduations correspond to a Jeppesen scale. Since these are drawn to the same scale as those used in aerial navigational charts, they can be used to measure distances on the charts and indicate relations between both scales or to any other scale. As is known to those skilled in this are, the WAC is the abbreviation for World Wide Aeronautical Chart and the Jeppesen is a radio navigation chart scale. Finally, the scale member 60 shown in FIG. 4 is an elongated rod having a series of speed scales marked along its length. This rod is adjustably clamped in position by means of a screw clamp 62 to use the scale member 60, the clamp 62 is loosened and the member 60 rotated until the ground speed as previously computed becomes visible. The arrangement of markings on this scale member is such that for each ground speed marking, the length of the member 60 is equally divided in increments of five minutes of flight equivalents thus permitting instantaneous readings of, for example, the time elapsed from a position indicated by the cursor for the plane to arrive at a further point along the indicated route.

Lastly, a further scale which is useful in connection with the present invention is a compass rose 64 and which is scribed or otherwise marked in the lower undersurface of housing 10.

From the foregoing it will be apparent that there is herein shown and disclosed a new and useful navigational aid for the piloting of aircraft and surface vessels. While a preferred embodiment has been herein shown and described, applicant claims the benefit of a full range of equivalents within the scope of the appended claims.

I claim:

1. An automatic visual position indicator for navigational use comprising in combination:

a flat elongated hollow transparent housing;

means for releasably clamping a navigational chart having a predetermined course line drawn thereon on the underside of said housing to position the course line longitudinally of said housing in position to be visible through the upper side of said housing;

a cursor member positioned within said housing;

means for moving said cursor longitudinally of said housing along the course marked on the chart and at a speed proportional to the actual speed of the vehicle;

whereby the position of said cursor automatically can continuously overlies that point on the chart corresponding to the actual position of the vehicle; and an erasable writing surface carried by said housing and extending the length thereof on which estimated and actual times of arrival at check points along the predetermined route may be manually entered as the trip progresses.

2. The combination defined in claim 1 including an elongated releasable clamped rotatable scale stick mounted along one longitudinal edge of the upper side of said housing, said stick including a plurality of longitudinally extending scales each corresponding to a particular vehicle speed so that the scales corresponding to the selected speed of the vehicle may be displayed to the user in conjunction with the navigational chart thus enabling rapid visual determination of the time required for the vehicle to reach predetermined points on the projected travel route.

3. The combination defined by claim 1 in which said means for moving said cursor includes:
- a rotatable screw extending longitudinally of said housing; nut means on said cursor and mating with said screw;
- a constant speed drive; and
- a continuously variable gearing between said drive and said screw.

4. The combination defined by claim 3 including means for manually disengaging said cursor nut means from said screw and for adjustably positioning said cursor to any desired position along said screw and then reengaging said nut means and screw.

* * * * *